US006977706B2

(12) United States Patent
Wu et al.

(10) Patent No.: US 6,977,706 B2

(45) Date of Patent: Dec. 20, 2005

(54) IN-PLANE SWITCHING MODE LIQUID CRYSTAL DISPLAY HAVING HEIGHTENED ELECTRODES

(75) Inventors: Yang-En Wu, Taipei (TW); Shih-Peng Tai, Kao-Hsiung Hsien (TW)

(73) Assignee: AU Optronics Corp., Hsin-Chu (TW)

(*) Notice: Subject to any disclaimer, the term of this patent is extended or adjusted under 35 U.S.C. 154(b) by 0 days.

(21) Appl. No.: 10/707,559

(22) Filed: Dec. 21, 2003

(65) Prior Publication Data

US 2004/0212768 A1 Oct. 28, 2004

(30) Foreign Application Priority Data

Apr. 25, 2003 (TW) .............................. 92109802 A

(51) Int. Cl.[7] ............................................ G02F 1/1343

(52) U.S. Cl. ...................................... 349/141; 349/139

(58) Field of Search ................................ 349/139, 141

(56) References Cited

U.S. PATENT DOCUMENTS

| | | | | |
|---|---|---|---|---|
| 5,598,285 | A * | 1/1997 | Kondo et al. | 349/39 |
| 6,285,428 | B1 * | 9/2001 | Kim et al. | 349/141 |
| 6,351,300 | B1 * | 2/2002 | Park et al. | 349/141 |
| 6,356,328 | B1 * | 3/2002 | Shin et al. | 349/141 |
| 6,507,382 | B1 * | 1/2003 | Sakamoto et al. | 349/141 |
| 6,583,840 | B1 * | 6/2003 | Inoue et al. | 349/141 |
| 6,876,418 | B2 * | 4/2005 | Hong | 349/129 |

* cited by examiner

*Primary Examiner*—Tarifur R. Chowdhury

(74) *Attorney, Agent, or Firm*—Winston Hsu

(57) ABSTRACT

An in-plane switching mode liquid crystal display (IPS-LCD) includes a top substrate and a bottom substrate being in parallel with and opposite to the top substrate, a first electrode and a second electrode elongated along a first direction in an interlaced arrangement, and a plurality of liquid crystal molecules filled in between the top substrate and the bottom substrate. The longitudinal axis of the liquid crystal molecules is positioned along a second direction horizontally. A bump is included in each of the first electrode and the second electrode and a conductive layer is disposed on a surface of the bump.

14 Claims, 9 Drawing Sheets

IN-PLANE SWITCHING MODE LIQUID CRYSTAL DISPLAY HAVING HEIGHTENED ELECTRODES

BACKGROUND OF INVENTION

1. Field of the Invention

The present invention generally relates to a liquid crystal display (LCD), and more particularly, to a liquid crystal display having a low driving voltage and a high driving velocity.

2. Description of the Prior Art

In a liquid crystal display, incident light will produce different polarization or refraction when the alignments of liquid crystal molecules are different to produce gorgeous images. Since an LCD has the advantages of being light-weight, having low energy consumption, and being free of radiation emission, the LCD is widely used in various portable products, such as notebooks, personal data assistants (PDA), video cameras, etc., and even has a great potential to replace the conventional CRT monitor.

However, a conventional twisted nematic (TN) liquid crystal display and a conventional super-twisted nematic (STN) liquid crystal display have a very narrow viewing angle due to the structure of liquid crystal molecules and characteristics of optics, leading to a lot of limitation in application. Therefore, LCD manufacturers are all devoted to developing an LCD having a new structure to provide a wide viewing angle. For example, an in-plane switching mode liquid crystal display (IPS-LCD) is disclosed in U.S. Pat. No. 6,111,627 to effectively improve the problem of the viewing angle in the conventional twisted nematic LCD.

Please refer to FIG. 1 and FIG. 2. FIG. 1 is a cross sectional schematic diagram of a conventional in-plane switching mode LCD 10. FIG. 2 is a corresponding top view of the conventional in-plane switching mode LCD 10. As shown in FIG. 1, the conventional IPS-LCD 10 comprises a first substrate 12, a second substrate 14 in parallel with and opposite to the first substrate 12, at least one first electrode 16 and at least one second electrode 18 disposed on an upper surface of the second substrate 14, an isolation layer 15 disposed between the first electrode 16 and the second electrode 18 for preventing the first electrode 16 and the second electrode 18 from short circuiting, a first polarizer 13*a* and a second polarizer 13*b* disposed on a lower surface of the second substrate 14 and an upper surface of the first substrate 12 respectively, a first alignment layer 19*a* and a second alignment layer 19*b* disposed on the second substrate 14 and a lower surface of the first substrate 12 respectively, and a plurality of positive dielectric constant anisotropy liquid crystal molecules 17 filled in between the first substrate 12 and the second substrate 14.

The first electrode 16 is a counter electrode or a common electrode, and the second electrode 18 is a pixel electrode. The rubbing axis of the first alignment layer 19*a* determines the original orientation of the liquid crystal molecules 17. The rubbing axis of the second alignment layer 19*b* is the same as the rubbing axis of the first alignment layer 19*a*. The polarized direction of the first polarizer 13*a* is the same as the rubbing axis of the first alignment layer 19*a*, and the polarized direction of the second polarizer 13*b* is perpendicular to the polarized direction of the first polarizer 13*a*.

As shown in FIG. 2, the first electrode 16 and the second electrode 18 are both in a comb shape. The first electrode 16 comprises a plurality of equally spaced branches 16*a*, 16*b*, 16*c*, which are in parallel with a signal line 22. The plurality of branches 16*a*, 16*b*, 16*c* are electrically connected to each other through a bar electrode 16*x* in parallel with a scan line 24, and the first electrode 16 is electrically connected to a common signal. The second electrode 18 and the first electrode 16 are in an interlaced arrangement. The second electrode 18 comprises a plurality of equally spaced branches 18*a*, 18*b*, which are in parallel with the signal line 22. The plurality of branches 18*a*, 18*b* are electrically connected to each other through a bar electrode 18*x* in parallel with the scan line 24. The bar electrode 18*x* is electrically connected to a thin film transistor 26 in a crossover region of the signal line 22 and the scan line 24 to control the turning on of a pixel unit of the IPS-LCD 10.

When the thin film transistor 26 is turned off, no voltage is applied between the first electrode 16 and the second electrode 18 and no electric field is formed. At this time, the longitudinal axis of the liquid crystal molecules 17 is in parallel with the rubbing axis of the first alignment layer 19*a* and the second alignment layer 19*b*. That means, the longitudinal axis of the liquid crystal molecules 17 is aligned to the direction that is coincident with the polarized direction of the first polarizer 13*a*. Therefore, no light can pass through the second polarizer 13*b*, and the observer cannot see any light emitted from the IPS-LCD 10. As a result, a perfect dark state of the IPS-LCD 10 is formed. When the thin film transistor 26 is turned on, the longitudinal axis of the liquid crystal molecules 17, affected by the electric field, gradually rotates from the original alignment direction to the alignment direction that is parallel to the electric field. That means, an angle difference is formed between the longitudinal axis of the liquid crystal molecules 17 and the polarized direction of the first polarizer 13*a* to allow light pass through, leading to a bright state of the IPS-LOD 10.

The conventional in-plane switching mode LCD can improve the problem of narrow viewing angle, which usually brings limitation to the conventional twisted nematic LCD. However, an LCD only having the advantage of wide viewing angle is not sufficient for today's requirement. When a voltage is applied between the pixel electrode and the counter electrode of the conventional in-plane switching mode LCD to generate a corresponding electric field, the electric lines nearby the color filter of the top substrate will bend. Thus, the rotation of the liquid crystal molecules is not as expected to affect various performance of the LCD.

It is therefore very important to resolve the above-mentioned problem when developing a wide viewing angle LCD to reduce the driving voltage and power consumption, improve the driving velocity to fulfill the requirement of animation projecting, increase the light efficiency of LCD and reduce cost of backlight, and simplify the processing and reduce total cost so as to produce a more competitive LCD product.

SUMMARY OF INVENTION

It is an object of the present invention to provide an in-plane switching mode liquid crystal display (IPS-LCD) having a low driving voltage and a high driving velocity.

According to one aspect of the present invention, an in-plane switching mode liquid crystal display comprises a bottom substrate, at least one first electrode, at least one second electrode, a top substrate, and a plurality of liquid crystal molecules. At least one pixel area is defined on an upper surface of the bottom substrate. The first electrode is disposed in the pixel area on the upper surface of the bottom substrate, and the first electrode is a protrusion elongated along a first direction. The second electrode is disposed in the pixel area on the upper surface of the bottom substrate.

The second electrode is a protrusion elongated along the first direction, and the second electrode and the first electrode are in an interlaced arrangement. The top substrate is in parallel with and opposite to the bottom substrate. The plurality of liquid crystal molecules is filled in between the bottom substrate and the top substrate. Wherein a longitudinal axis of the liquid crystal molecules is positioned along a second direction and is horizontally arranged between the upper surface of the bottom substrate and a lower surface of the top substrate, and an angle is formed between the second direction and the first direction.

Since an in-plane switching mode liquid crystal display according to the present invention heightens the pixel electrode and the common electrode with a bump, the electric lines of the biased electric field between the pixel electrode and the common electrode are straightened to accelerate the rotation of the liquid crystal molecules. Consequently, each of the liquid crystal molecules rotates to the expected angle earlier. Therefore, not only is the problem of the narrow viewing angle which always occurs in a conventional twisted nematic liquid crystal display improved, but also the driving voltage is reduced to improve the driving velocity and the transmittance of the in-plane switching mode liquid crystal display.

These and other objectives of the present invention will become apparent to those of ordinary skill in the art after having read the following detailed description of the preferred embodiments illustrated in the various drawings.

DETAILED DESCRIPTION

Figure 1:
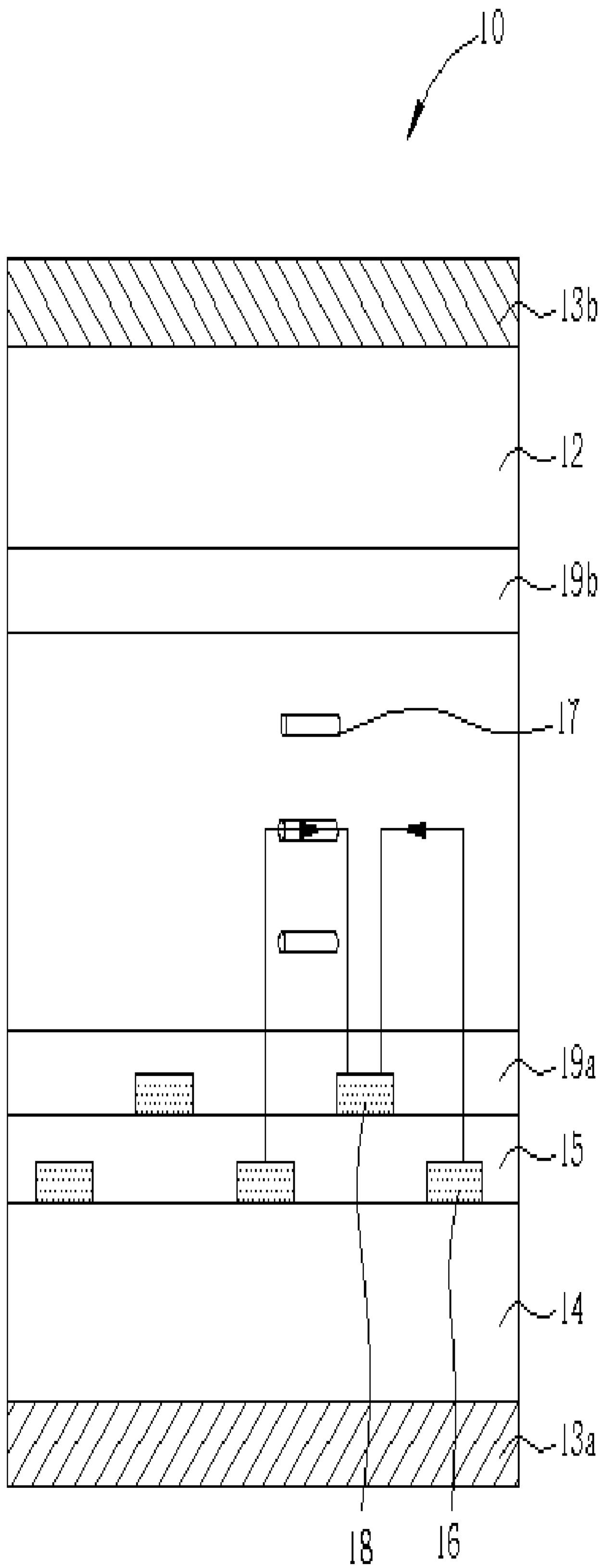
FIG. 1 is a cross sectional schematic diagram of a conventional in-plane switching mode LCD.
Figure 2:
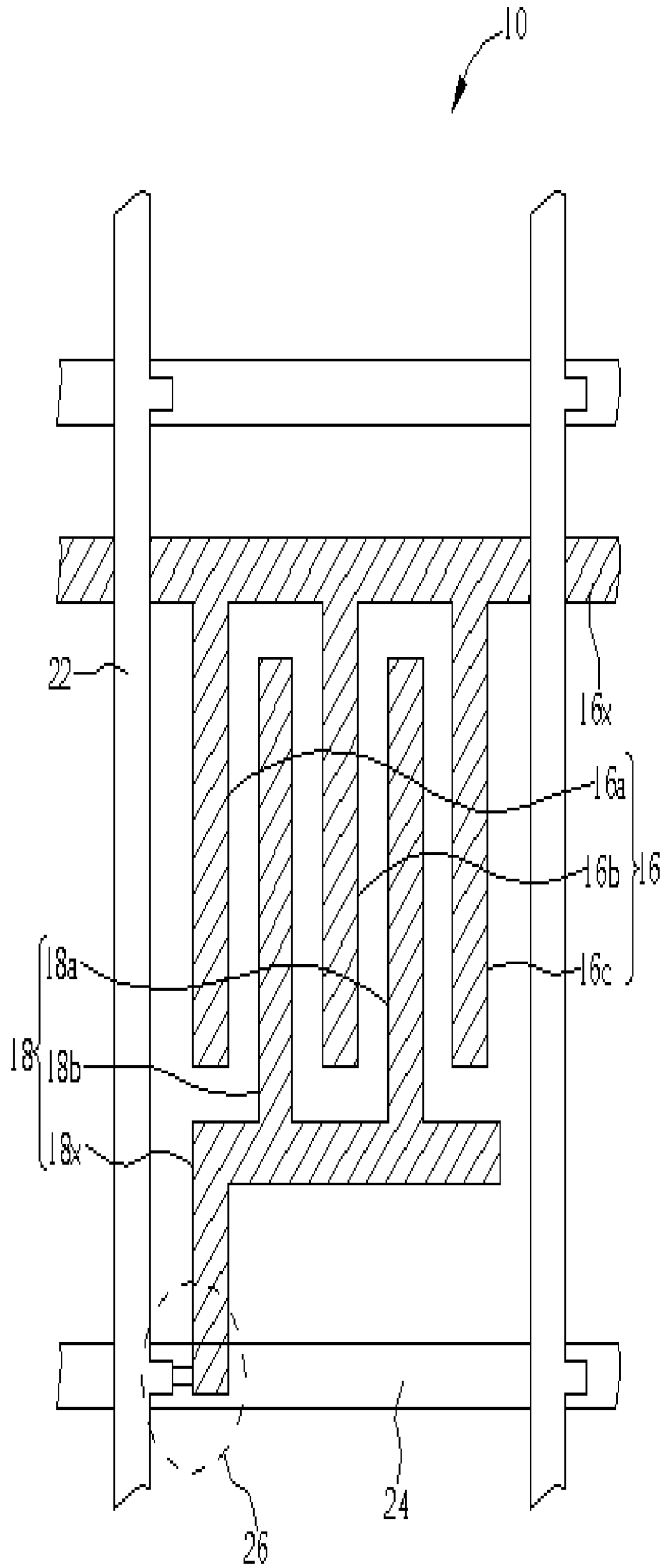
FIG. 2 is a corresponding top view of the conventional in-plane switching mode LCD.
Figure 3:
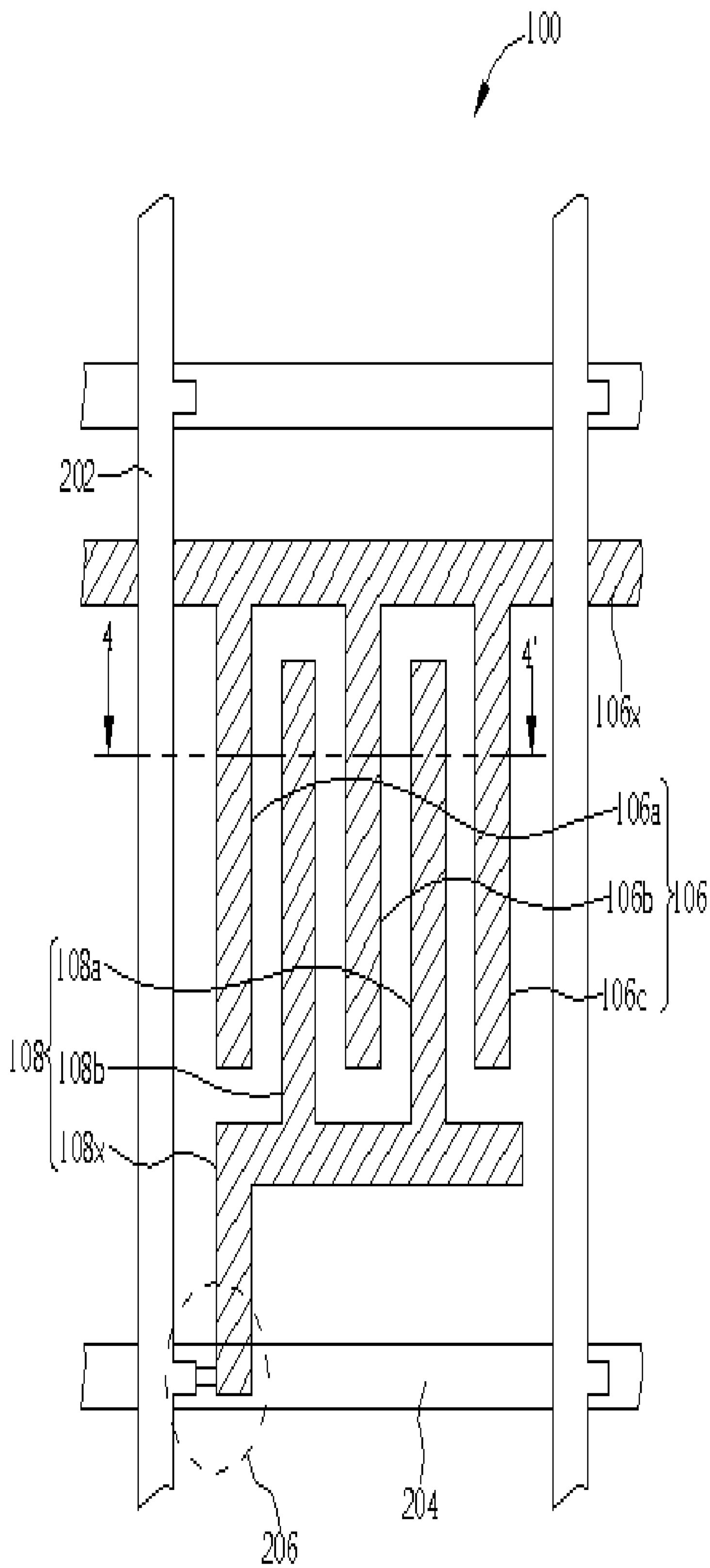
FIG. 3 is a top view of an in-plane switching mode LCD having a low driving voltage and a high driving velocity according to a first preferred embodiment of the present invention.
Figure 4:
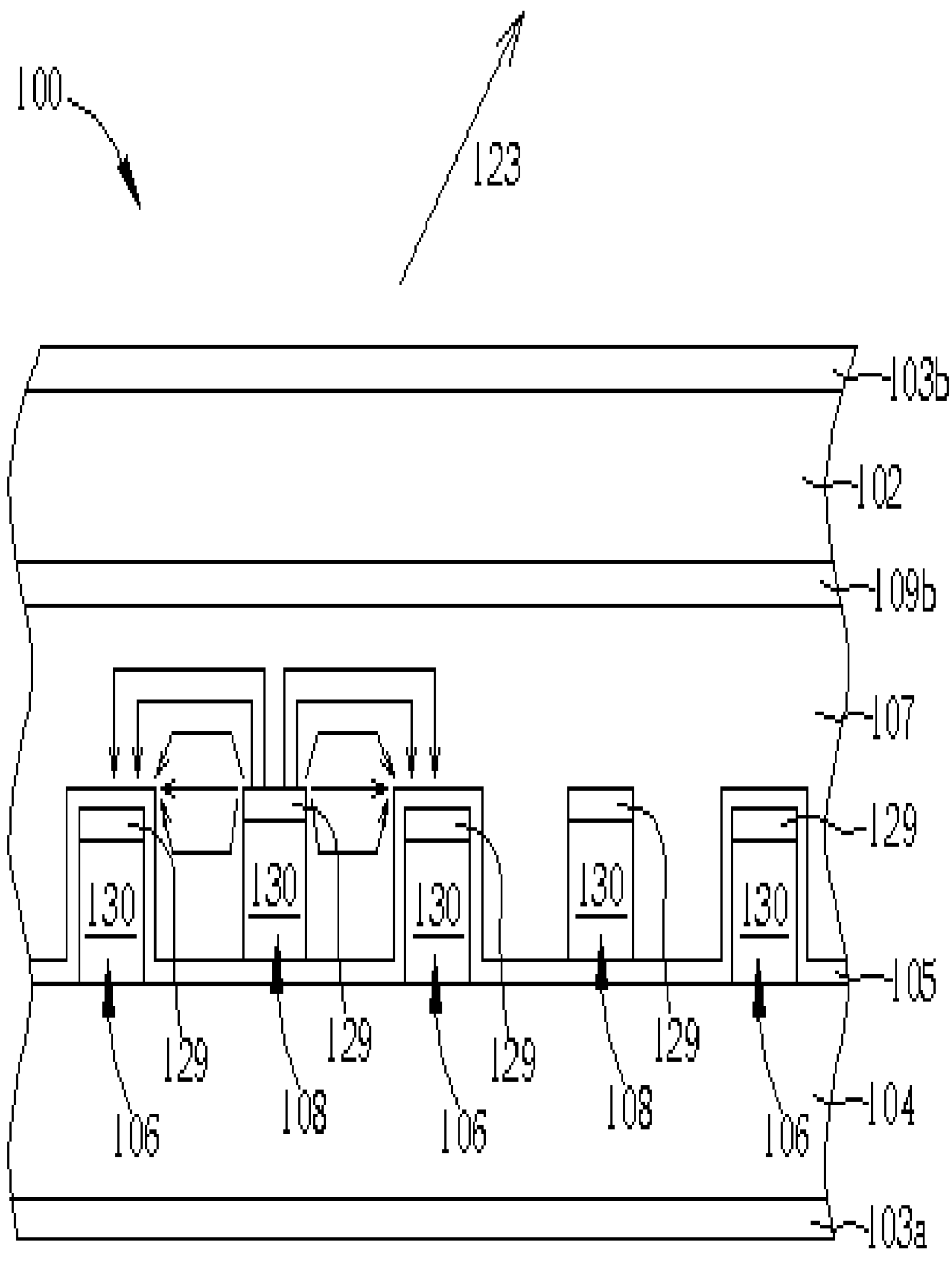
FIG. 4 and FIG. 5 are cross sectional schematic diagrams of the in-plane switching mode LCD along line 4–4' of FIG.3.
Figure 5:
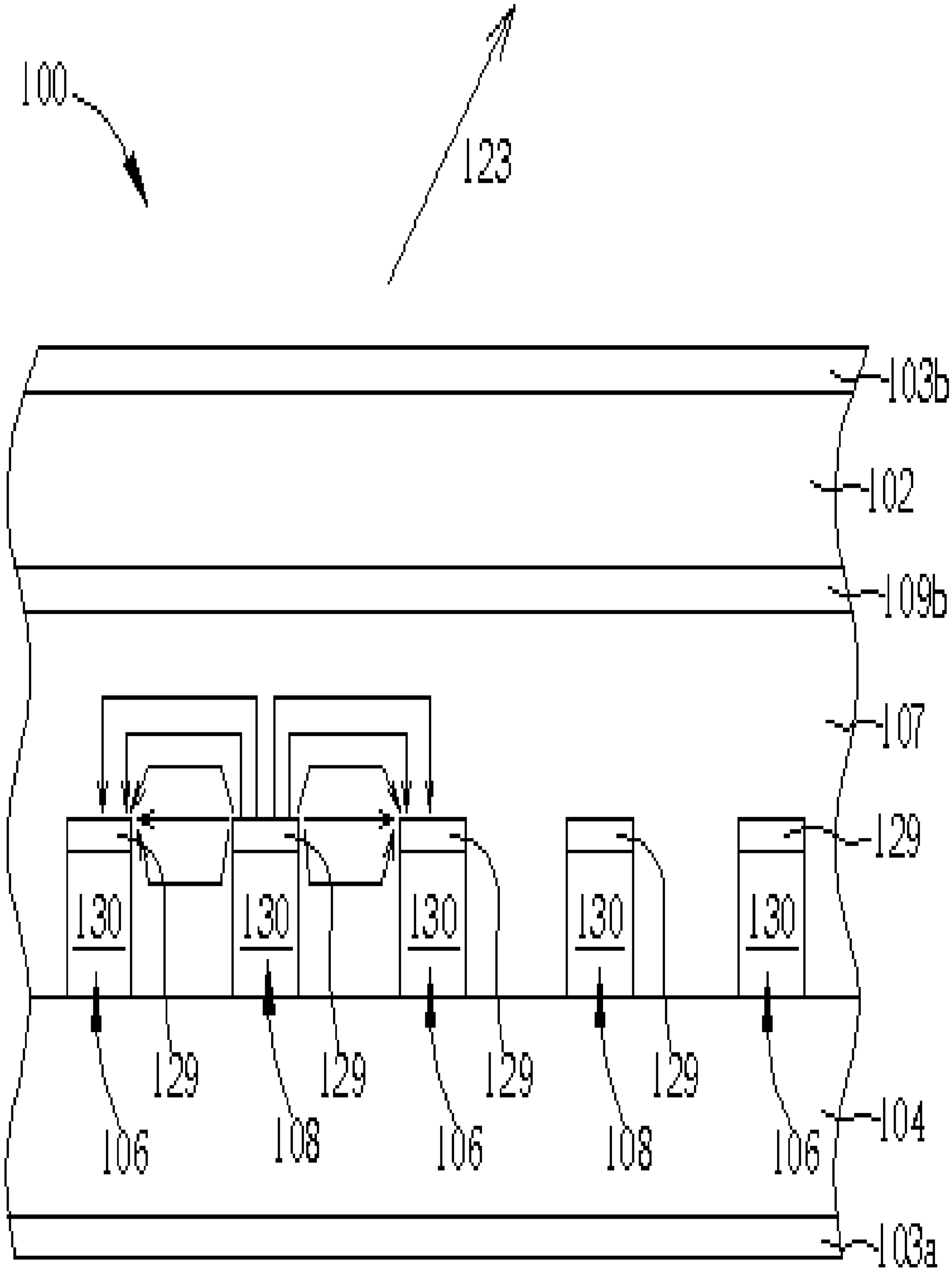

Please refer to FIG. 3 and FIG. 5. FIG. 3 is a top view of an in-plane switching mode LCD 100 having a low driving voltage and a high driving velocity according to a first preferred embodiment of the present invention. FIG. 4 and FIG. 5 are cross sectional schematic diagrams of the in-plane switching mode LCD 100 along line 4–4" of FIG. 3. As shown in FIG. 3 and FIG. 4, the present invention IPS-LCD 100 comprises a first substrate 102, a second substrate 104 in parallel with and opposite to the first substrate 102. The first substrate 102 may be a top substrate or a bottom substrate. Relatively, the second substrate 104 may be a bottom substrate or a top substrate. In the preferred embodiment of the present invention disclosed in FIG. 3 and FIG. 4, the first substrate 102 is a top substrate and the second substrate 104 is a bottom substrate. However, the present invention may be applied to the structure in which the first substrate 102 is a bottom substrate and the second substrate 104 is a top substrate.

As shown in FIG. 3, at least one first electrode 106 and at least one second electrode 108 are disposed in the pixel area on an upper surface of the second substrate 104 opposite to the first substrate 102. The first electrode 106 is used as a common electrode or a counter electrode of the IPS-LCD 100, and the second electrode 108 is used as a pixel electrode of the IPS-LCD 100. Both the first electrode 106 and the second electrode 108 are in a comb shape. The first electrode 106 comprises a plurality of equally spaced branches **106*a*, 106*b*, 106*c*, which are in parallel with a signal line 202. The plurality of branches 106*a*, 106*b*, 106*c* are electrically connected to each other through a bar electrode 106*x* in parallel with a scan line 204, and the first electrode 106 is electrically connected to a common signal directly or through a via hole (not shown). The second electrode 108 and the first electrode 106 are in an interlaced arrangement. The second electrode 108 comprises a plurality of equally spaced branches 108*a*, 108*b*, which are in parallel with the signal line 202. The plurality of branches 108*a*, 108*b* are electrically connected to each other through a bar electrode 108*x* in parallel with the scan line 204. The bar electrode 108*x* is electrically connected to a thin film transistor 206 in a crossover region of the signal line 202 and the scan line 204 to control the turning on of a pixel unit of the IPS-LCD 100**.

It is worth noticing that the second electrode 108, used as the pixel electrode and the first electrode 106, used as the common electrode, are both protrusions elongated along a first direction 123. Both of the first electrode 106 and the second electrode 108 comprise a bump 130 and a conductive layer 129 disposed on a surface of the bump 130. Each conductive layer 129 may be only disposed on the top surface of each bump 130 (as shown in FIG.4 and FIG.5), or be disposed on the top surface and the lateral surface of each bump (not shown). A width of both of the first electrode 106 and the second electrode 108 is approximately 3–8 μm. A spacing between each branch **106*a*, 106*b*, 106*c* of the first electrode 106 and each branch 108*a*, 108*b* of the second electrode 108 is approximately 8–16 μm. A height of each bump 130, composed of a transparent material, is approximately 0.5–2 μm. Each conductive layer 129 disposed on the surface of each bump 130 is composed of a transparent material to increase the aperture ratio and the transmittance of the IPS-LCD 100. Actually, the material compositions of the bump 130 and the conductive layer 129** are not limited to transparent materials, and non-transparent material is able to be adapted.

As shown in FIG. 4, the IPS-LCD 100 further comprises an isolation layer 105 disposed between the first electrode 106 and the second electrode 108 for preventing the first electrode 106 and the second electrode 108 from short circuiting, a first polarizer **103*a* and a second polarizer 103*b* disposed on a lower surface of the second substrate 104 and an upper surface of the first substrate 102 respectively, a first alignment layer (not shown) and a second alignment layer 109*b* disposed on the second substrate 104 and a lower surface of the first substrate 102 respectively, and a liquid crystal molecule layer 107, having a plurality of positive dielectric constant anisotropy liquid crystal molecules or a plurality of negative dielectric constant anisotropy liquid crystal molecules, filled in between the first substrate 102 and the second substrate 104. The rubbing axis of the first alignment layer (not shown) determines the original orientation of the liquid crystal molecules in the liquid crystal molecule layer 107. The rubbing axis of the second alignment layer 109***b* is the same as the rubbing axis of the first alignment layer (not shown). The polarized direction of the first polarizer 103*a* is perpendicular to the rubbing axis of the first alignment layer (not shown), and the polarized direction of the second polarizer 103*b* is perpendicular to the polarized direction of the first polarizer 103*a*. In addition, the first electrode 106 and the second electrode 108 may be simultaneously formed on the upper surface of the second substrate 104 if the isolation layer 105 is not disposed between the first electrode 106 and the second electrode 108, as shown in FIG. 5. In this case, via holes or other layout methods are utilized to electrically connect necessary signals to straighten the electric lines of the biased electric field. AS a result, the rotation of the liquid crystal molecules is accelerated effectively.

Figure 6:
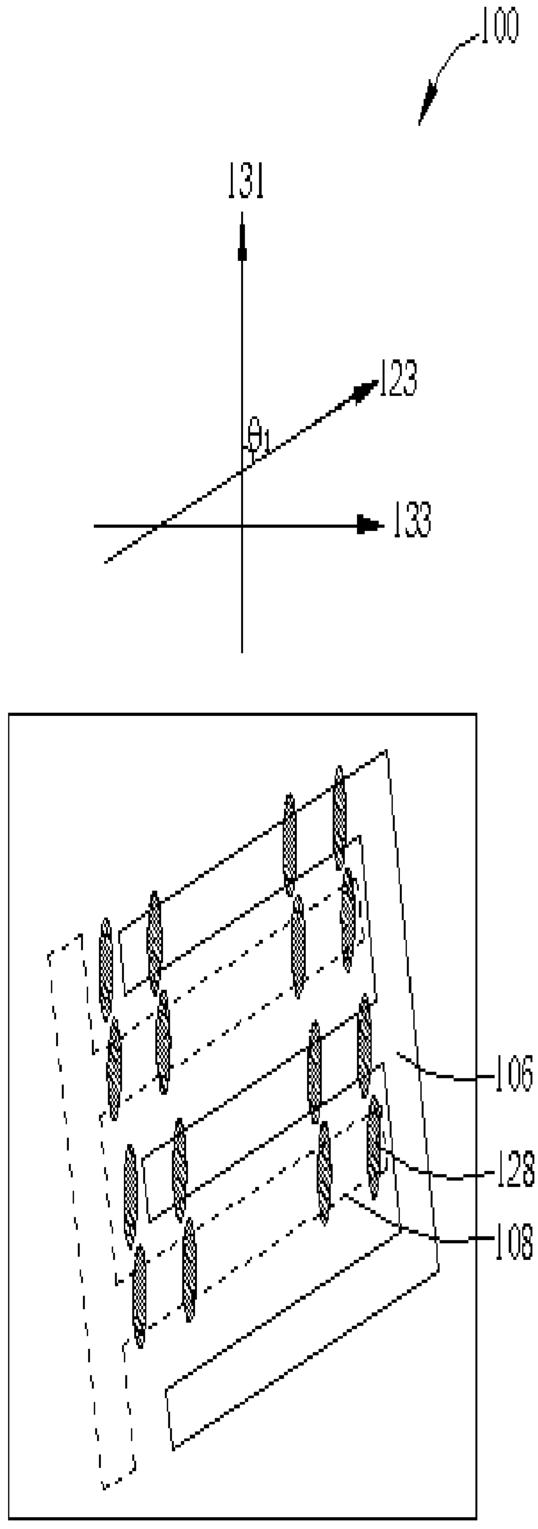
FIG. 6 and FIG. 7 are schematic diagrams of the operation of the present invention IPS-LCD shown in FIG. 3.
Figure 7:
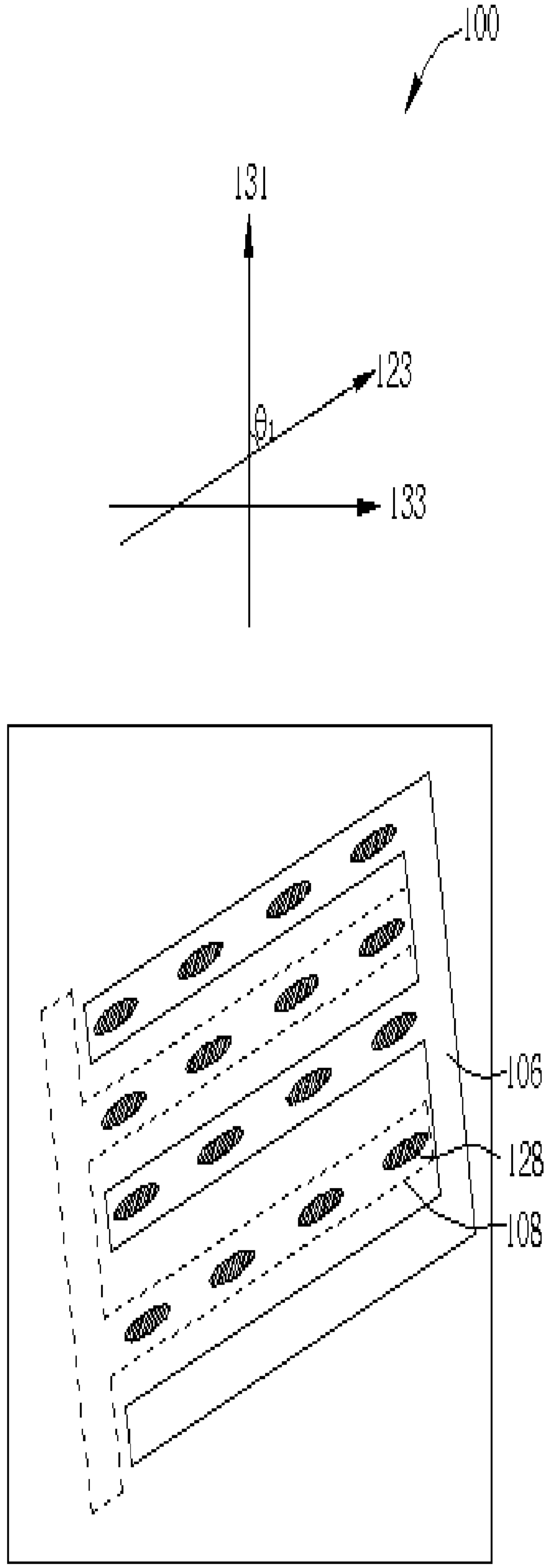

Please refer to FIG. 6 and FIG. 7. FIG. 6 and FIG. 7 are schematic diagrams of the operation of the present invention IPS-LCD 100 shown in FIG. 3. As shown in FIG. 6, when the thin film transistor 206 (shown in FIG. 3) is turned off, no voltage is applied between the first electrode 106 and the second electrode 108 and no electric field is formed. At this time, the longitudinal axis of liquid crystal molecules 128 in the liquid crystal molecule layer 107 is aligned to a second direction 131. An angle $\theta\theta_1$ s formed between the second direction 131 and the first direction 123, and the second direction 131 is perpendicular to the polarized direction 133 of the first polarizer 103*a*. Therefore, light can pass through the first polarizer 103*a*, but cannot be polarized by the liquid crystal molecules 128 to result in a dark state of the IPS-LCD 100. Since the orientation direction of the liquid crystal molecules 128 is completely perpendicular to the polarized direction 133 of the first polarizer 103*a*, a perfect dark state of the IPS-LCD 100 is formed when no electric field is applied. Furthermore, the rubbing axis of the second alignment layer 109*b* may be the same as the rubbing axis of the first alignment layer (not shown), the polarized direction of the first polarizer 103*a* may be the same as the rubbing axis of the first alignment layer (not shown), and the polarized direction of the second polarizer 103*b* may be perpendicular to the polarized direction of the first polarizer 103*a* in the present invention. Under the circumstances, light cannot pass through the second polarizer 103*b*, leading to the perfect dark state too. Because the principle in such a situation is the same as the above-mentioned principle, it is not mentioned redundantly.

As shown in FIG. 7, when the thin film transistor 206 (shown in FIG. 3) is turned on and a corresponding image signal is transmitted through the signal line 202, a biased electric field perpendicular to the first direction 123 is generated between the second electrode 108 and the first electrode 106. Since a bump 130, having a height of approximately 0.5–2$\mu\mu$, is disposed at the bottom of each of the second electrode 108 and the first electrode 106, the second electrode 108 and the first electrode 106 are thus heightened. In comparison with the not heightened pixel electrode and the counter electrode according to the prior art, the heightened second electrode 108 and the heightened first electrode 106 will change the electric line distribution of the biased electric field by straightening the electric lines (as shown in FIG. 4 and FIG. 5). The straightened electric lines will accelerate the rotation of liquid crystal molecules 128. As a result, the liquid crystal molecules 128 gradually rotate from the second direction 131, which they originally aligned, to the alignment direction 123 that is parallel to the second electrode 108 and the first electrode 106, when the liquid crystal molecules 128 are negative dielectric constant anisotropy liquid crystal molecules. That means, an angle difference is formed to allow light pass through, leading to a bright state of the IPS-LCD 100. Because the biased electric field is an electric field in parallel with a surface of the second substrate 104, the rotation of each liquid crystal molecule 128 is maintained on a fixed plane. Actually, the liquid crystal molecules 128 may gradually rotate from the second direction 131 to the alignment direction (not shown) that is perpendicular to the second electrode 108 and the first electrode 106, when the liquid crystal molecules 128 are positive dielectric constant anisotropy liquid crystal molecules.

In summary, the present invention changes the electric line distribution of the biased electric field to enhance the driving ability of the biased electric field for each liquid crystal molecule to allow each liquid crystal molecule to rotate to an expected angle earlier. The driving voltage of the IPS-LCD 100 is thus reduced, and the transmittance of the IPS-LCD 100 is thus increased.

Figure 8:
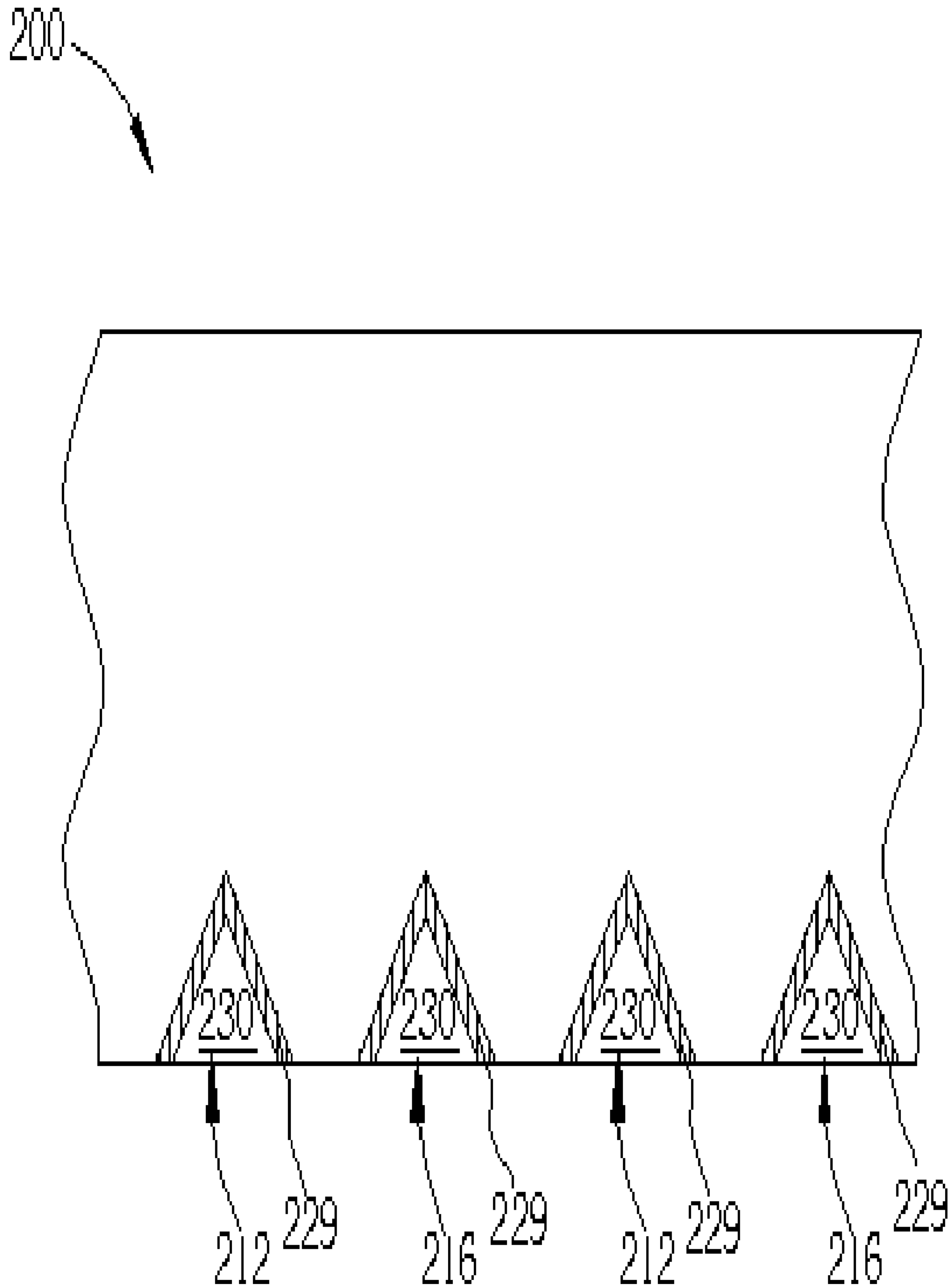
FIG. 8 is a cross sectional schematic diagram of an in-plane switching mode LCD along line 4–4" of FIG. 3 according to a second preferred embodiment of the present invention.

Please refer to FIG. 8. FIG. 8 is a cross sectional schematic diagram of an in-plane switching mode LCD 200 along line 4–4' of FIG. 3 according to a second preferred embodiment of the present invention. As shown in FIG. 8, each of pixel electrodes 212 and common electrodes 216 comprises a bump 230 in a shape of a triangular prism and a conductive layer 229 disposed on a surface of the bump 230. A width of both of the pixel electrode 212 and the common electrode 216 is approximately 3–8 $\mu$m, and a spacing between each branch of the pixel electrode 212 and the common electrode 216 is approximately 8–16 $\mu$m. The bump 230, having a height of approximately 0.5–2 $\mu$m, is composed of a transparent material. Furthermore, the conductive layer 229 disposed on the surface of each bump 230 is also composed of a transparent conductive material to increase the aperture ratio and the transmittance of the IPS-LCD 200. In fact, the material compositions of the bump 230 and the conductive layer 229 are not limited to transparent materials; non-transparent material is able to be adapted. Since the operation principle of the IPS-LCD 200 in FIG. 8 is the same as the principle mentioned in FIG. 6 and FIG. 7, it is not mentioned redundantly.

Figure 9:
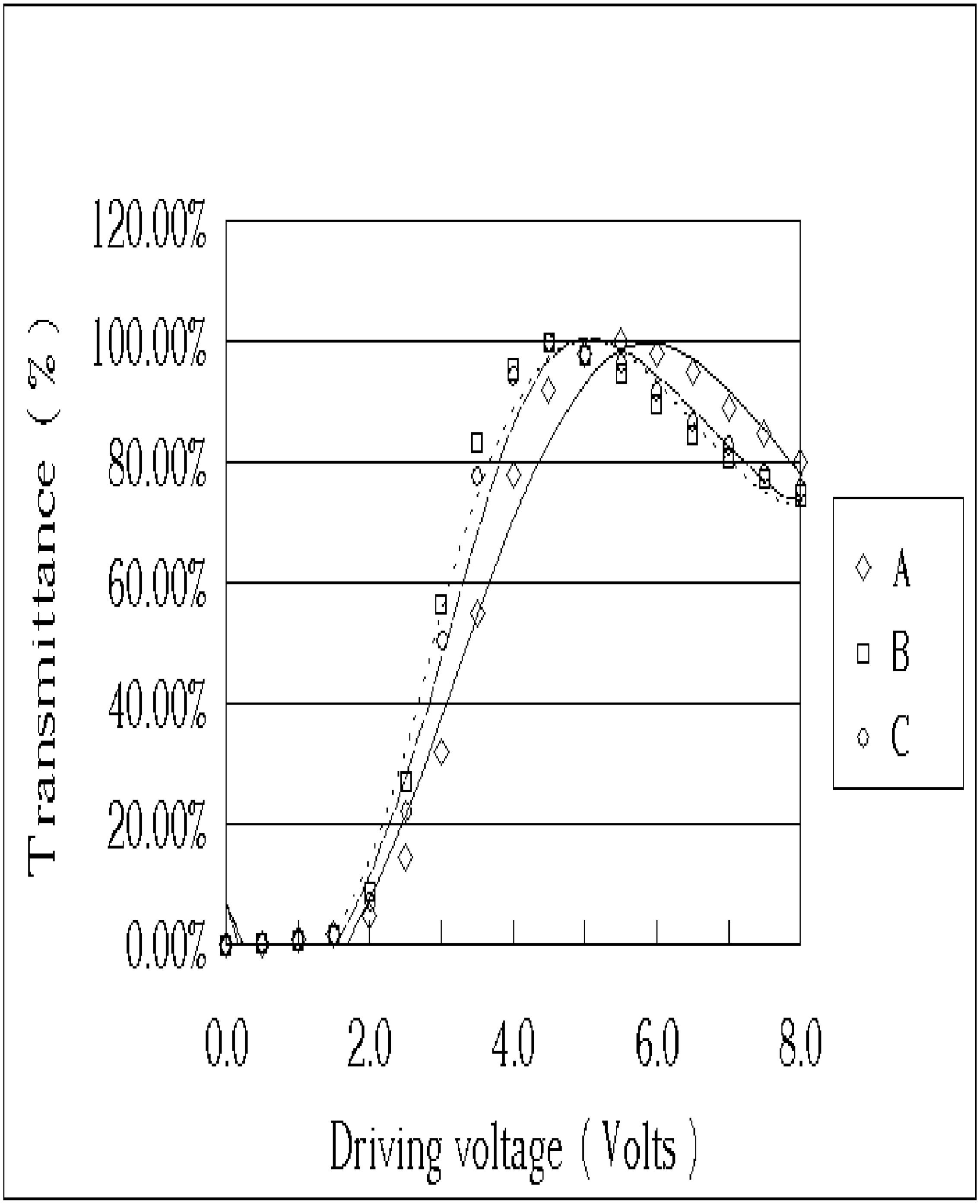
FIG. 9 is a comparison chart of voltage-transmittance curves of the present invention IPS-LCDs and the prior art IPS-LCD having no bump.

Please refer to FIG. 9. FIG. 9 is a comparison chart of voltage-transmittance curves of the present invention IPS-LCDs 100, 200 and the prior art IPS-LCD 10 having no bump. In FIG. 9, the width of both of the pixel electrode and the common electrode is 4 $\mu$m, the spacing between each branch of the pixel electrode and the common electrode is 4 $\mu$m, and a cell gap is 4 $\mu$m. By utilizing these common parameters, simulation is executed to obtain the curves. In curve A, both of the pixel electrode and the common electrode are in a shape of a traditional rectangular prism, and no bump is disposed at the bottom of them; in curve B, both of the pixel electrode and the common electrode are in a shape of a traditional rectangular prism, and a bump having a height of approximately 1 $\mu$m is disposed at the bottom of each or them; in curve C, both of the pixel electrode and the common electrode are in a shape of a triangular prism, and a bump having a height of approximately 1 $\mu$m is disposed at the bottom of each or them.

As shown in FIG. 9, curve A represents the prior art IPS-LCD 10, curve B represents the present invention IPS-LCD 100, and curve C represents the present invention IPS-LCD 200. When the voltage applied is 4.5V, the transmittance of the IPS-LCD 100 and the IPS-LCD 200, represented by curve B and curve C respectively, both reach 100%. In comparison with the IPS-LCD 10 represented by curve A, a lower driving voltage is achieved. At the same time, the rotation of the liquid crystal molecules in the IPS-LCD 100 and the IPS-LCD 200, represented by curve B and curve C respectively, is driven by straightened electric lines to effective improve the driving velocities of the IPS-LCD 100 and the IPS-LCD 200. Furthermore, the shape of the pixel electrode and the common electrode in the present invention in-plane switching mode LCD is not limited to the shapes disclosed in the above two preferred embodiments. In addition, the width of the pixel electrode and the common electrode, the spacing between the pixel electrode and the common electrode, the width of the bump, and the shape of the cross section of the bump may be changed according to practical requirements. Any method resulting in straightened electric lines to accelerate the rotation of the liquid crystal molecules is within the scope of the present invention.

The present invention in-plane switching mode liquid crystal display disposes a bump at the bottom of each of the pixel electrode and the common electrode to straighten the electric lines of the biased electric field due to the heightened pixel electrode and the heightened common electrode. The rotation of the liquid crystal molecules is thus accelerated to allow the liquid crystal molecules to rotate to the expected angles earlier. Not only is the problem of the narrow viewing angle which always occurs in a conventional twisted nematic liquid crystal display improved, but also the driving voltage is reduced and the driving velocity and the transmittance are both improved. In addition, the processing is kept simple to have cost superiority.

As compared to the prior art in-plane switching mode liquid crystal display, the present invention in-plane switching mode liquid crystal display disposes a bump at the bottom of each of the pixel electrode and the common electrode to heighten the pixel electrode and the common electrode. The electric lines of the biased electric field are thus straightened to effectively accelerate the rotation of the liquid crystal molecules. As a result, each of the liquid crystal molecules rotates to the expected angle earlier. Not only is the problem of the narrow viewing angle which always occurs in a conventional twisted nematic liquid crystal display improved, but also the driving voltage is reduced and the driving velocity and the transmittance are both improved. Therefore, a liquid crystal display having a wide viewing angle is fabricated. The total power consumption is reduced due to the lowered driving voltage, the driving velocity is improved to fulfill the requirement of animation projecting, the light efficiency of the LCD is increased to reduce cost of backlight, and the processing is kept simple to not increase total cost. When applying the present invention liquid crystal display structure on a pratical production line, a very competitive liquid crystal display is produced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An in-plane switching mode (IPS) liquid crystal display (LCD) comprising:

a bottom substrate, at least one pixel area being defined on an upper surface of the bottom substrate;

at least one first electrode disposed in the pixel area on the upper surface of the bottom substrate, the first electrode being a protrusion elongated along a first direction;

at least one second electrode disposed in the pixel area on the upper surface of the bottom substrate, the second electrode being a protrusion elongated along the first direction, and the second electrode and the first electrode being in an interlaced arrangement;

a plurality of bumps formed beneath the first electrode and the second electrode for changing the distribution of the biased electric field to enhance the driving ability of the biased electric field;

a conductive layer disposed on a surface of each bump;

a top substrate being in parallel with and opposite to the bottom substrate; and a plurality of liquid crystal molecules filled in between the bottom substrate and the top substrate;

wherein a longitudinal axis of the liquid crystal molecules is positioned along a second direction and is horizontally arranged between the upper surface of the bottom substrate and a lower surface of the top substrate, and an angle is formed between the second direction and the first direction.

2. The in-plane switching mode liquid crystal display of claim 1 further comprising a first polarizer and a second polarizer disposed on an upper surface of the top substrate and a lower surface of the bottom substrate respectively.

3. The in-plane switching mode liquid crystal display of claim 2 wherein a polarized direction of the first polarizer is parallel to the second direction, and a polarized of the second polarizer is perpendicular to the second direction.

4. The in-plane switching mode liquid crystal display of claim 2 wherein a polarized direction of the first polarizer is perpendicular to the second direction, and a polarized direction of the second polarizer is parallel to the second direction.

5. The in-plane switching mode liquid crystal display of claim 1 wherein the first electrode comprises a transparent pixel electrode or a non-transparent pixel electrode.

6. The in-plane switching mode liquid crystal display of claim 1 wherein a cross section of the first electrode is approximately in a shape of a rectangle, a triangle, or a semi-circle.

7. The in-plane switching mode liquid crystal display of claim 1 wherein the second electrode comprises a transparent common electrode or a non-transparent common electrode.

8. The in-plane switching mode liquid crystal display of claim 1 wherein a cross section of the second electrode is approximately in a shape of a rectangle, a triangle, or a semi-circle.

9. The in-plane switching mode liquid crystal display of claim 1 further comprising an isolation layer disposed between the first electrode and the second electrode to isolate the first electrode and the second electrode for preventing the first electrode and the second electrode from short circuiting.

10. The in-plane switching mode liquid crystal display of claim 1 wherein a biased electric field perpendicular to the first direction is formed between the first electrode and the second electrode when an external voltage is applied between the first electrode and the second electrode to accelerate the rotation of each liquid crystal molecule so as to reduce a driving voltage of the in-plane switching mode liquid crystal display.

11. The in-plane switching mode liquid crystal display of claim 10 wherein the biased electric field is an electric field in parallel with a surface of the bottom substrate to maintain the rotation of each liquid crystal molecule on a fixed plane.

12. The in-plane switching mode liquid crystal display of claim 1 wherein a width of both of the first electrode and the second electrode is approximately 3–8 μm, a spacing between the first electrode and the second electrode is approximately 8–16 μm, and a height of each bump is approximately 0.5–2 μm.

13. The in-plane switching mode liquid crystal display of claim 1 wherein the liquid crystal molecule comprises a negative dielectric constant anisotropy liquid crystal molecule or a positive dielectric constant anisotropy liquid crystal molecule.

14. The in-plane switching mode liquid crystal display of claim 1 further comprising a first alignment layer and a second alignment layer disposed on the lower surface of the top substrate and the upper surface of the bottom substrate respectively.

* * * * *